(12) United States Patent
Mishra et al.

(10) Patent No.: US 7,616,662 B2
(45) Date of Patent: Nov. 10, 2009

(54) PARSER FOR PARSING DATA PACKETS

(75) Inventors: Shridhar Mubaraq Mishra, Berkeley, CA (US); Chunfeng Hu, Singapore (SG)

(73) Assignee: Infineon Technologies AG, Munich (DE)

( * ) Notice: Subject to any disclaimer, the term of this patent is extended or adjusted under 35 U.S.C. 154(b) by 609 days.

(21) Appl. No.: 10/526,992

(22) PCT Filed: Sep. 6, 2002

(86) PCT No.: PCT/SG02/00210

§ 371 (c)(1),
(2), (4) Date: Mar. 7, 2005

(87) PCT Pub. No.: WO2004/023762

PCT Pub. Date: Mar. 18, 2004

(65) Prior Publication Data

US 2005/0256821 A1 Nov. 17, 2005

(51) Int. Cl.
*H04J 3/24* (2006.01)
(52) U.S. Cl. ..................... 370/474; 709/250
(58) Field of Classification Search .............. None
See application file for complete search history.

(56) References Cited

U.S. PATENT DOCUMENTS

| | | | | |
|---|---|---|---|---|
| 5,414,650 A * | 5/1995 | Hekhuis | ............ | 708/203 |
| 5,748,905 A | 5/1998 | Hauser et al. | | |
| 5,916,305 A * | 6/1999 | Sikdar et al. | ............ | 709/236 |
| 5,917,821 A | 6/1999 | Gobuyan et al. | | |
| 6,356,951 B1 * | 3/2002 | Gentry, Jr. | ............ | 709/250 |
| 6,480,489 B1 * | 11/2002 | Muller et al. | ............ | 370/389 |
| 6,611,524 B2 * | 8/2003 | Devanagondi et al. | ... | 370/395.5 |
| 6,778,495 B1 * | 8/2004 | Blair | ............ | 370/230 |
| 7,187,694 B1 * | 3/2007 | Liao | ............ | 370/474 |
| 7,304,996 B1 * | 12/2007 | Swenson et al. | ............ | 370/394 |
| 2002/0003795 A1 * | 1/2002 | Oskouy et al. | ............ | 370/389 |
| 2003/0108038 A1 * | 6/2003 | Devanagondi et al. | ...... | 370/389 |

FOREIGN PATENT DOCUMENTS

| | | |
|---|---|---|
| WO | WO 0052897 A1 | 9/2000 |
| WO | WO 0101272 A2 | 1/2001 |
| WO | WO 0133774 A1 | 5/2001 |

OTHER PUBLICATIONS

Shah, Niraj, "Understanding Network Processors", XP002208129, Sep. 4, 2001, (89 pages).

* cited by examiner

*Primary Examiner*—Kwang B Yao
*Assistant Examiner*—Jeffrey M Rutkowski
(74) *Attorney, Agent, or Firm*—Maginot, Moore & Beck

(57) ABSTRACT

A parser system is arranged to receive a data stream (1) having interleaved sections derived from a plurality of different packets, and to extract data from each section as it arrives. The parser system has a scanning section which receives information about each of the sections of data defining which packet it relates to, and employs this information and the properties of the data stream, to identify the locations of layer (2), layer (3) and layer (4) data. This information is passed to parser units (7), (9) which extract data based on this data and also offsets. The offsets for the parser (7) are stored in user-programmable registers (9).

16 Claims, 4 Drawing Sheets

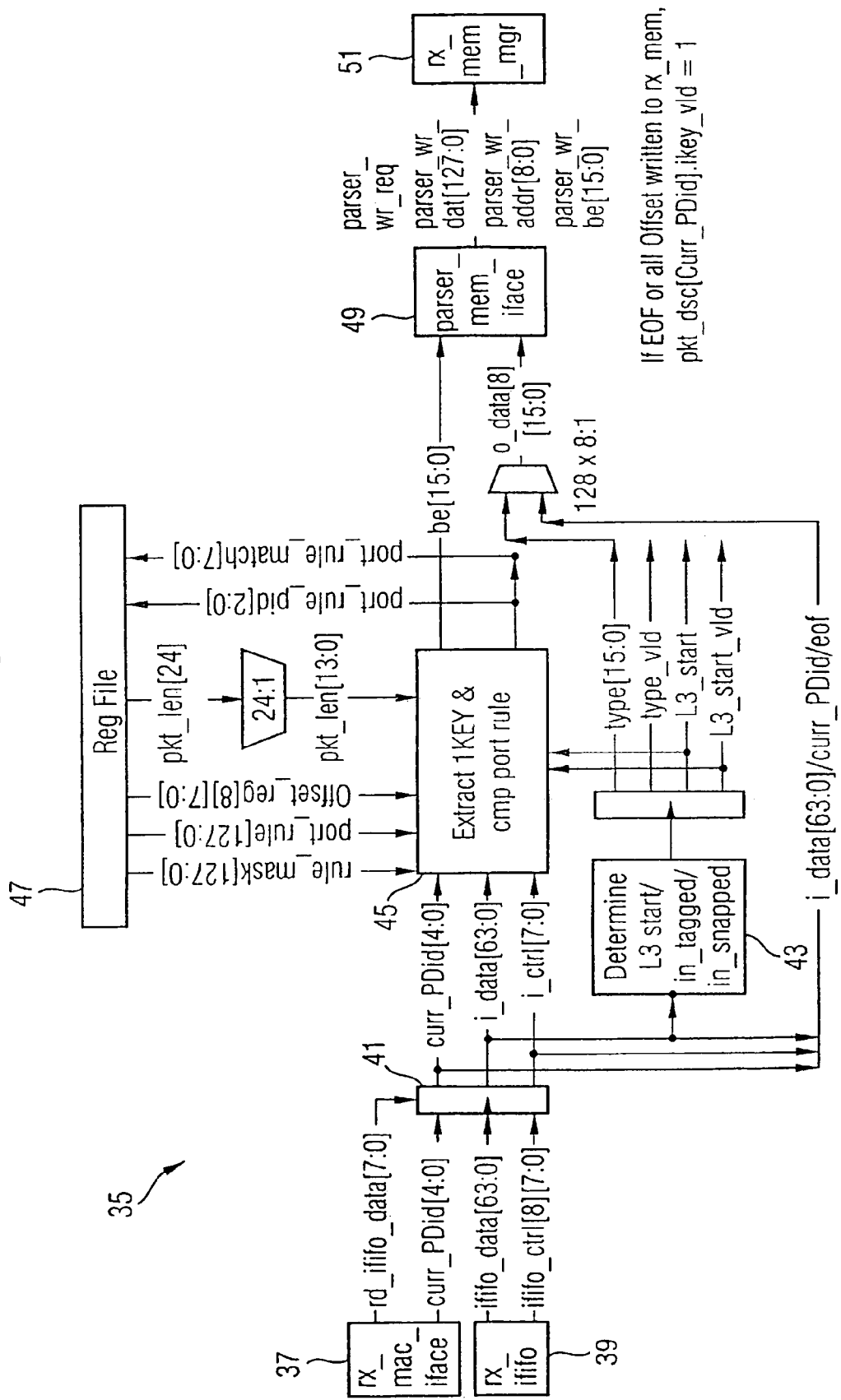

PARSER FOR PARSING DATA PACKETS

RELATED APPLICATIONS

The present rule is a group of five patent application having the same priority date. Application PCT/SG02/000211 relates to an switch having an ingress port which is configurable to act either as eight FE (fast Ethernet) ports or as a GE (gigabit Ethernet port). Application PCT/SG02/000210 relates to a parser suitable for use in such as switch. Application PCT/SG02/000207 relates to a flow engine suitable for using the output of the parser to make a comparison with rules. Application PCT/SG02/000209 relates to monitoring bandwidth consumption using the results of a comparison of rules with packets. Application PCT/SG02/000213 relates to a combination of switches arranged as a stack. The respective subjects of the each of the group of applications other than in combination with the technology described in the other four application, but the disclosure of the other applications of the group is incorporated by reference.

FIELD OF THE INVENTION

The present invention relates to a parser system for parsing multiple data packets to extract information from them. In a particular example, the parser system may be employed in a switch such as an Ethernet switch to parse received data packets and thereby obtain information which is required for processing the packet by the queue management system and switching fabric.

BACKGROUND OF INVENTION

Recent advances in Internet technology have changed the way we exchange information. Ubiquitous use of the Internet has led to the idea of convergence, The different types of data (e.g. video, sounds, pictures and text) must traverse the same network, and this has given rise to a plethora of protocols which aim to transmit real time and data traffic on a single network with quality of service support.

Chief among these protocols are DiffServ, IntServ and MPLS, which each require packet classification (i.e. determination of the packet's type) in real time when it is received. The first step in this classification is to extract relevant bytes from a packet, "parsing". This is described in Chapter I of "Computer Networks", Andrew S Tanenbaum, Prentice Hall $2^{nd}$ Ed, 1988.

The parsing operation includes determining whether the packet includes tags. For example, conventionally Ethernet packets may include a VLAN (virtual local area network) tag—i.e. a tag which indicates a VLAN associated with the packet. A VLAN tag is conventionally 4-bytes inserted into the Ethernet frame between the Source MAC Address field and the Length/Type field. The first 2 bytes of the VLAN tag are always set to a value of 0x8100, while the second two bytes are control information (user priority field, canonical format indicator and VLAN identifier).

Another type of tag is defined by the SNAP protocol (sub-network access protocol), which was introduced to allow older frames and protocols to be encapsulated in a Type 1 LLC header so making any protocol 'pseudo-IEEE compliant'. The SNAP tag (or "snap encapsulation") is placed directly after the standard length/type field of the Ethernet packet (which always takes a value less than or equal to 1500), and has AA-AA as its first two bytes. A packet containing a SNAP tag is called SNAPped.

Generally, an Ethernet packet is made up of levels of nested data, known as layers. Data which is interpreted directly by a machine is called "layer 1", or physical layer, data. "Layer 2", or data link layer, data is LAN (local area network) data, such as MAC (media access control) data uniquely identifying an adapter on the LAN. Within the "layer 2" packet may be "layer 3", or network layer, data defining among other things the IP source address and destination address of the packet. Within the layer 3 packet may be "layer 4" data, or transport layer data, e.g. TCP (transmission control protocol) data.

In view of the great variety of protocols which may be encountered, it would be useful to provide a parsing technique which is highly flexible.

Additionally, there are a variety of circumstances in which it would be useful to parse a plurality of concurrently received data packets. Such circumstances are not limited to Ethernet applications, but, taking Ethernet applications as an example, in a co-pending pending application referred to above, the present inventors propose a configurable Ethernet switch which can function both as a Fast Ethernet and as a Gigabit Ethernet switch, in order to facilitate the transition from FE to GE Ethernet. A data port can be operated as eight FE MAC interfaces or alternatively as a single GE MAC interface. In the former case, it may happen that the eight FE interfaces receive packets at the same time. It would be possible-to provide sufficiently large buffers at the input port that all of these packets are completely received before the processing of any one of the packets begins, but this increases the cost of the buffers required. It would instead be useful to be able to process all of the packets concurrently ("on-the-fly") as they are received to reduce the buffering requirement.

SUMMARY OF THE INVENTION

A first aspect of the invention proposes in general terms that a parser system is arranged to receive a data stream having interleaved sections derived from a plurality of different packets, and to extract data from each section as it arrives. The parser system receives information about each of the sections of data defining which packet it relates to, and employs this information to identify data to be extracted from the data stream.

A second aspect of the invention relates to a parser system having a number of programmable registers which store data for the parser, the parser system receiving a data stream and extracting data from it based on offset information stored in the programmable registers.

In either aspect of the invention, the parser system preferably includes a scanning section which identifies the location of major structural features of data in the data stream (e.g. a location where one of the layers of data commences), and at least one parser unit which uses the output of the scanning section and offset information (at least partly from the programmable registers in the case of the second aspect of the invention) to extract the data. The offset information identifies the offset of the data to be extracted from the location of the structural features.

The scanning section uses the received information about the data stream, and also examines the data itself to identify characteristics of packets in the data stream. For example, in addition to determining the location of the start of any one or more of layer 2, layer 3 and/or layer 4 data in the packets, it may further be able to identify if the packet is VLAD tagged and/or SNAPed.

There may be two parser units, one of which extracts data according to predefined offsets and the structural data from the scanning section, and the other extracting data according to the structural data from the scanning section and offsets defined by the programmable registers.

BRIEF DESCRIPTION OF THE FIGURES

Preferred features of the invention will now be described, for the sake of illustration only, with reference to the following figures in which:

FIG. 4 shows the parser system of FIG. 1 as a circuit diagram.

DETAILED DESCRIPTION OF THE EMBODIMENTS

Figure 1:
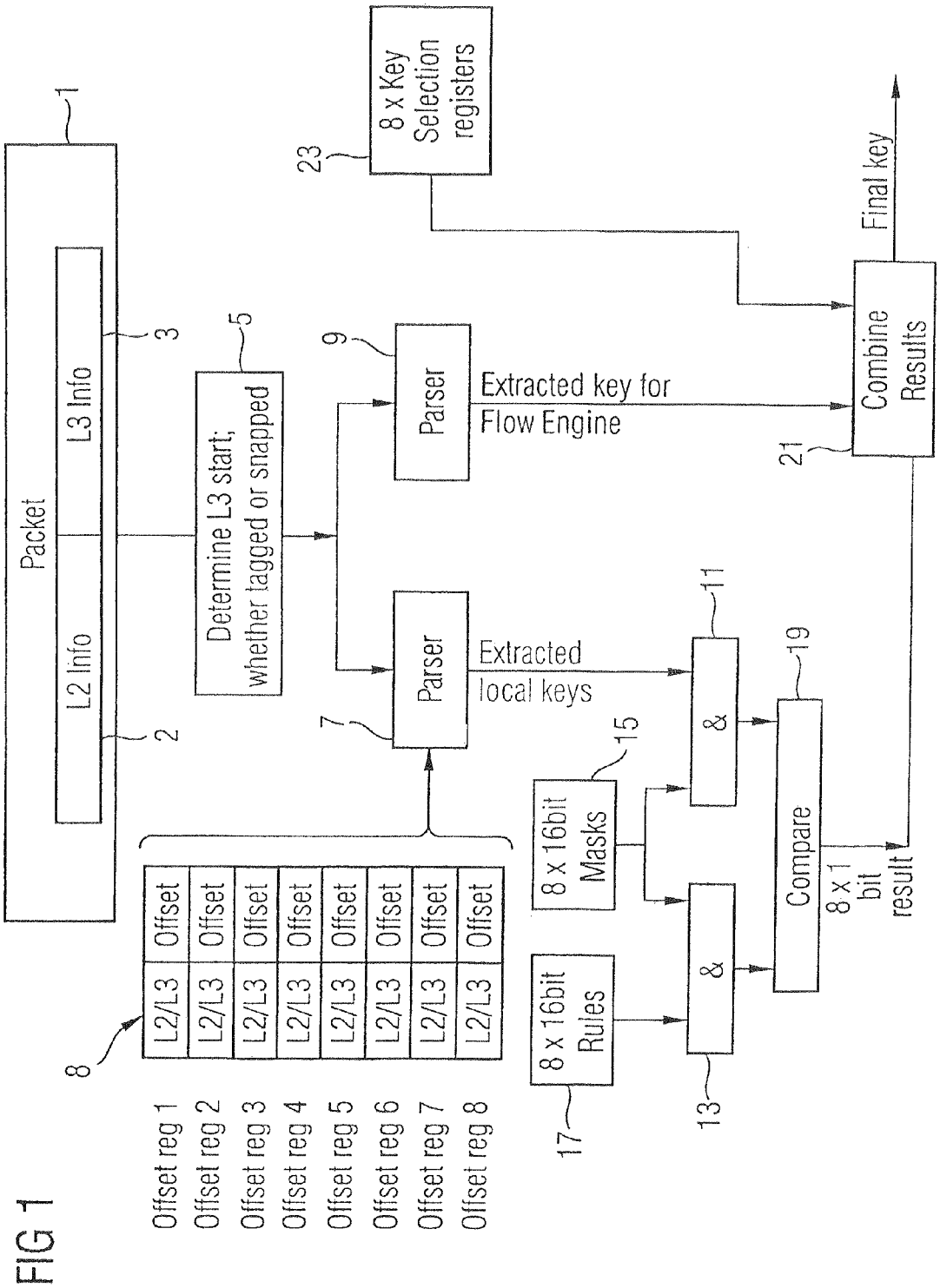
FIG. 1 shows schematically the operation of a parser system which is an embodiment of the invention.

Referring firstly to FIG. 1, the operation of the embodiment is shown schematically.

The embodiment processes a data steam having packets 1 containing layer 2 data 2 (starting at bit 0) and layer 3 data 3 In fact the packet will also contain layer 4 data, but for the purposes of this embodiment this may be treated simply as part of the level 3 data. The position of the start of the layer 4 data is given by a field which is part of the layer 3 data.

The data stream enters FIG. 1 as a series of sections of predetermined length. Preferably the data stream consists of a series of concurrent packets interleaved. For example, there may be up to 8 packets, which are divided into sections (e.g. of 8 bytes at a time), the sections of different data packets being interleaved. The steps of FIG. 1 are performed on one of these sections at any time, using information about which of the packets the section comes from. This means that there is no need to buffer the entire data stream as it arrives.

The first step (step 5) of the operation is to determine the layer 3 start offset, and whether the data is VLAN tagged or SNAPed. To begin with, for each 8 bytes received the algorithm calculates various variables as follows. Firstly, it updates a count variable (length) which indicates the number of bytes of the packet received so far, by adding the number of new bytes to the previous value of length. A variable index is defined as the largest integer which is no greater than length divided by 8. A variable offset is then defined as length modulus 8.

Figure 3:
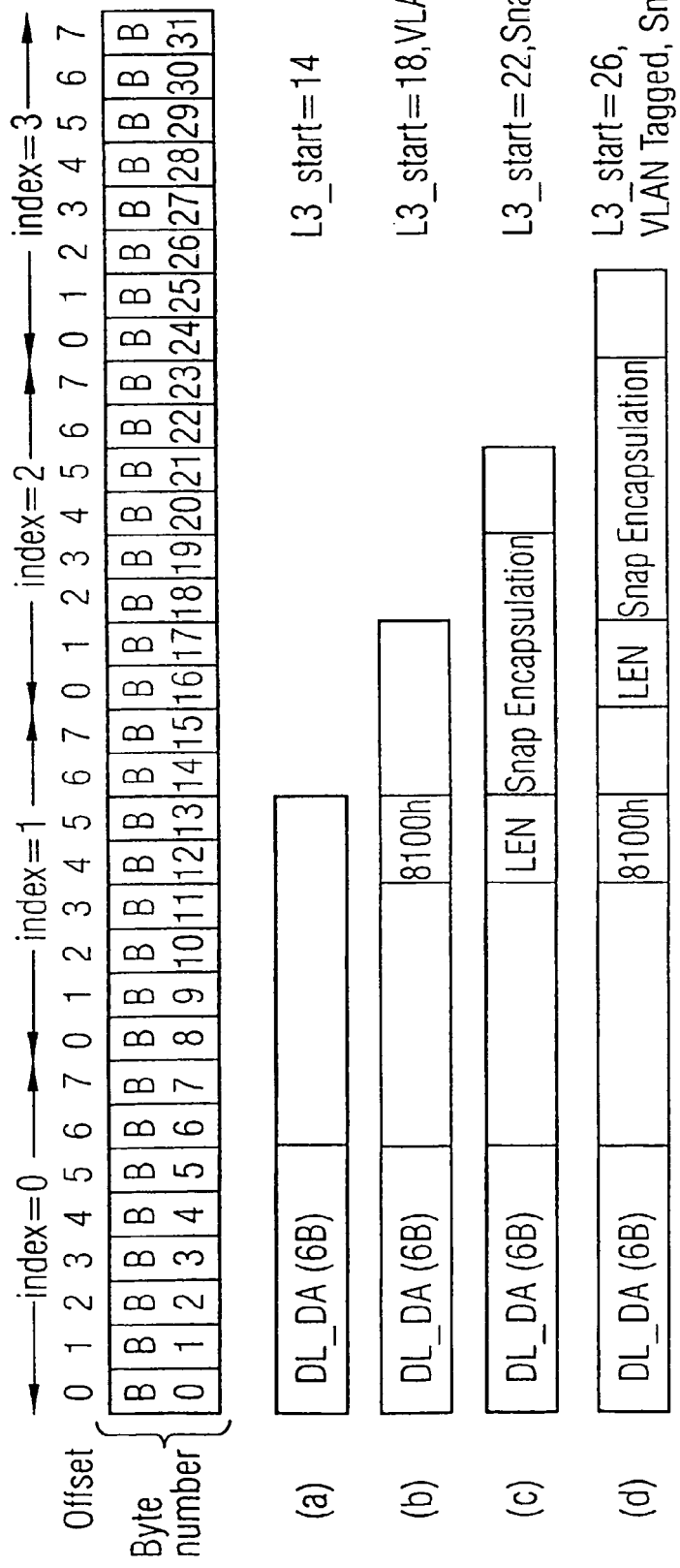
FIG. 3 shows the structure of 4 types of packets to be parsed by the embodiment.

FIG. 3 shows the variables index and offset for 4 types of packet, labelled (a), (b), (c) and (d) having the data shown in byte locations marked by the row marked as "byte number".

Packet type (a) is not VLAN tagged or snapped, and layer 3 starts at byte 14.

Packet type (b) is VLAN tagged (so that bytes 12 and 13 are 0x8100 (a hex notation) and layer 3 starts at byte 18.

Packet type (c) is SNAPped with snap encapsulation starting at byte 14, and layer 3 data starts at byte 22. The bytes at positions 14 to 19 are 0xAA-AA-03-00-00-00.

Packet type (d) is SNAPped with snap encapsulation starting at byte 18 and also VLAN tagged (so that bytes 12 and 13 are 8100), and layer 3 data starts at byte 26. The bytes at positions 18 to 23 are 0xM-AA-03-00-00-00.

To determine the position of the L3 start, the following steps are performed at a time when the variable length is such that index is 1:

Check the bytes at offset 4 and 5. If they are not 0x8100 and not less than 1500, then the byte is type (a), and layer 3 starts at byte 14.

Otherwise, if the bytes at offset 4 and 5 are 0x8100, then the packet is tagged (the packet must be type (b) or type (d)). Set a variable tagged to be equal to 1.

Otherwise, if the bytes at offset 4 and 5 are less than or equal to 1500, and the bytes at offsets 6 and 7 are 0xAA-AA, then the packet must be snapped. Set a variable snapped to be equal to 1.

Otherwise, the packet is in an unknown protocol.

When the next section of the data packet arrives, so that the variable length is such that index is 2:

Check the bytes at offsets 0 and 1. If they are greater than 1500 and tagged=1, then the packet is type (b) and layer 3 begins at byte 18.

Otherwise, if the bytes at offsets 0 and 1 are less than or equal to 1500 and tagged=1, then set snapped=1.

If tagged=1 and snapped=1 and the bytes at offsets 2 to 7 are AA-AA-03-00-00-00, then the packet is type (d), and layer 3 starts at byte 22.

Otherwise, if tagged=0 and snapped=1 and the bytes at offsets 0 to 3 are 0x03-00-00-00, then the packet is type (c), and layer 3 starts at byte 22.

Otherwise, the protocol is unknown.

Referring once more to FIG. 1, once the positions of the start of the layer 3 (and other layers) are known, the section of the data stream is passed to a first parser 7 and to a second parser 9 as discussed below. Note that the step 5 operation, and the first parser 7 and second parser 9 operations are performed on one of these sections at any time. In this case, the step 5 operation uses section identity information identifying which packets the section of data belongs to, and for example in the case that there are multiple packets maintains a set of variables (e.g. variable length) for each of those packets. In the processing of a section of the data stream derived from a given packet, step 5 involves updating the variables for the corresponding packet. The parsers 1 and 2 do not have to know this information however.

The first parser 7 extracts data from the packet according to positions defined by a set of registers 8. For example, when 8 bytes are to be extracted, 8 registers (labelled Offset reg 1, . . ., Offset reg 8) are used. Each register holds an indication ("L 2 /L 3 ") of whether data is to be extracted from the layer 2 or layer 3 data, and also an offset indicating which bytes are to be extracted relative to this starting positions of those layers. In this way the first parser 7 is able to extract local keys. The extracted local keys are compared in an AND operation 11 with 8 16-bit masks 15 (each of the 8 registers extracts 16 bits). The same 8 16-bit masks 15 are compared with 8 16-bit rules 17 by an AND operation 13. The results of the AND operations 13 and 11 are compared in step 19 to produce 8 1-bit results.

Meanwhile the second parser 9 receives the same data stream and the results of the determination of the start of the layers, and extracts a set of 8 bits determined by 8 key selection registers 23. The outputs of the second parser 9 are compared with those of the compare operation 19 in a step 21.

Figure 2:
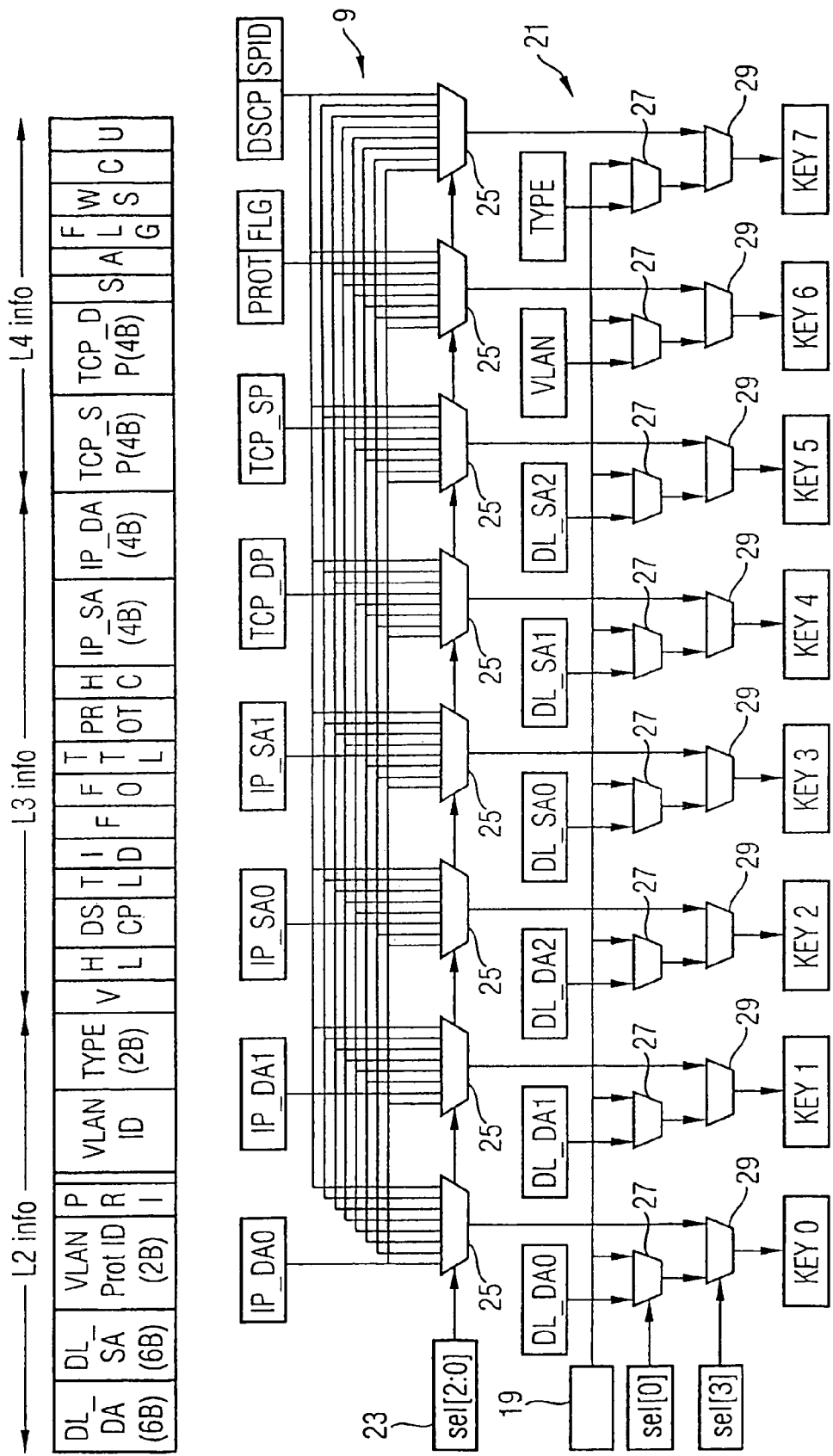
FIG. 2 shows schematically how key extraction is performed by the second parser and combiner of the embodiment of FIG. 1.

The operation of the second parser 9 and of the combine unit 21 is shown in FIG. 2. The upper portion of FIG. 2 shows the conventional structure of a data packet, starting with layer 2 data ("L2 info"), then layer 3 data ("L3 info"), then layer 4 data ("L4 info"). Using the results of the layer position determination algorithm, the second parser 9 is fed selected ones of the bytes as shown of FIG. 2. According to the outputs of programmable selector 23, the MUX multiplex units 25 output one of their inputs. These are fed to further MUX multiplex units 27, 29. The MUX units 27 receive other portions of the data packet, and also output of the first parser 7. The MUX units 29 receive the respective outputs of the MUX units 27, and also of the respective MUX units 25. MUX units 27, 29 are controlled based on selection signals sel[0] 31, sec[3] 31, which also come from the programmable registers 23. The result is the extracted key for the flow engine.

Referring to FIG. 1 again, a combination 21 of the outputs of the compare operation 19 and the key for the flow engine is made, to generate a final key. The uses of this key will be clear to a skilled reader, as will the exact operation of the two parsers.

FIG. 4 shows the layout of a parser system circuit 35 for implementing the steps of FIG. 1 in the context of an Ethernet switch. The parser system circuit 35 operates on 8 bytes at a time, and has an input interface 41 which receives inputs from a buffer rx_ififo 39 which receives packets from the pins of the Ethernet switch, and also from a MAC interface rx_max_ififo 37 which provides control information including an index identifying the packet description associated with the corresponding packet (this constitutes the section identification information discussed above). The step 5 operation of FIG. 1 is implemented by a unit 43, and the results transmitted inter alia to a unit 45 which functions as the first and second parser and performs the combinations shown in FIG. 1 to generate the final key. The unit 45 receives the other data it requires, such as the data of registers 9, 17 and 15 of FIG. 2, from a register file 47. The parser puts all the information for each stream of data (i.e. for each of the concurrent packets) within the packet descriptor for the corresponding packet. By operating on 8 bytes at a time with 2 cycles per processing step the parser is able to manage 8 FE streams.

The output of the unit 45 passes to an output interface 49 of the parser parser_mem_iface, which in turn passes it to other components of the Ethernet switch, in particular to a memory manager rx_mem_mgr 51. Note that all the circuitry of the parser system circuit 35 is preferably implemented on a single integrated circuit.

The invention claimed is:

1. A parser system comprising:
an interface configured to receive a data stream composed of interleaved sections of a plurality of different packets, and to receive section identity information about each of the sections of data defining to which packet it relates;
a scanning section configured to identify structural features of the packets using the section identify information, the structural features including the location of the start of one or more of layer 2 and layer 3 data in the packets; and
a parsing unit configured to process the data stream in a section-by-section manner and to employ the section identity information to identify and extract data from the sections of the plurality of different packets, the parsing unit comprising:
a first parser configured to extract data using offset information stored in user-programmable registers, the user offset information including an indication of whether data is to be extracted from the layer 2 or layer 3 data, and an indication of the location of the data to be extracted relative to the location of the start of the layer 2 or layer 3 data; and
a second parser configured to extract data from the packets in locations defined by the identified structural features of the packets and predetermined offset information.

2. The parser system according to claim 1, wherein the scanning section is further configured to identify tagged packets.

3. The parser system of claim 2 wherein the scanning section is further configured to identify snapped packets.

4. The parser system according to claim 1, wherein the interface is configured to receive a data stream including eight packets, each of which are divided into sections eight bytes in length, the sections of the eight packets being interleaved.

5. The parser system according to claim 4, wherein the scanning section is further configured to calculate a set of variables for each eight bytes received, the set of variables including: a length variable which indicates the number of bytes received so far, an index variable which indicates the largest integer which is no greater than the length variable divided by eight, and an offset variable which indicates the length variable modulus eight.

6. The parser system according to claim 5, wherein the scanning section is configured to identify, based on the set of variables calculated, the start of the layer 3 of the packets and whether the packets include a VLAN or SNAP tag.

7. The parser system according to claim 5, wherein the first parser is configured to extract eight 16-bit local keys using the offset information stored in the user-programmable registers, and wherein the parsing unit is further configured to:
perform an AND operation on the extracted local keys and eight 16-bit masks;
perform an AND operation on the masks and eight 16-bit rules, and
compare the results of the AND operations to produce eight 1-bit results.

8. The parser system according to claim 7, wherein the second parser is configured to extract a set of eight bits using the predetermined offset information provided in key selection registers, and wherein the parsing unit further comprises a combine unit configured to combine the set of eight bits and the eight 1-bit results to produce a final key.

9. A method of parsing a data stream using a computer including user-programmable registers, and a scanning section in communication with a first parser and a second parser, the method comprising:
receiving a data stream composed of interleaved sections of a plurality of different packets;
receiving section identity information about each of the sections of data defining which packet it relates to; and
processing the data stream in a section-by-section manner, said processing including:
using the scanning section to identify structural features of the packets using the section identity information, the structural features including the location of the start of one or more of layer 2 and layer 3 data in the packets
extracting, using the first parser, data from the sections of the plurality of different packets based on offset information stored in the user-programmable registers, the offset information including an indication of whether data is to be extracted from the layer 2 or layer 3 data, and an indication of the location of the data to be extracted relative to the location of the start of the layer 2 or layer 3 data; and
extracting, using the second parser, data from the sections of the plurality of different packets in locations defined by the identified structural features of the packets and predetermined offset information.

10. The method of claim 9 wherein the identifying structural features step includes identifying tagged packets.

11. The method of claim 10 wherein the identifying structural features step includes identifying snapped packets.

12. The method according to claim 9, wherein receiving the data stream comprises receiving eight packets, each of which are divided into sections eight bytes in length, the sections of the eight packets being interleaved.

13. The method according to claim 12, wherein identifying structural features comprises calculating a set of variables for each eight bytes received, the set of variables including: a length variable which indicates the number of bytes received so far, an index variable which indicates the largest integer which is no greater than the length variable divided by eight, and an offset variable which indicates the length variable modulus eight.

14. The method according to claim 13, wherein identifying structural features comprises identifying, based on the set of variables calculated, the start of the layer 3 of the packets, and whether the packets include a VLAN or SNAP tag.

15. The method according to claim 12, wherein extracting using a first parser comprises extracting eight 16-bit local keys based on the offset information stored in the user-programmable registers, the method further comprising:
- performing an AND operation on the extracted local keys and eight 16-bit masks;
- performing an AND operation on the masks and eight 16-bit rules, and
- comparing the results of the AND operations to produce eight 1-bit results.

16. The method according to claim 15, wherein extracting using the second parser comprises extracting a set of eight bits based on the predetermined offset information in key selection registers, the method further comprising combining the set of eight bits and the eight 1-bit results to produce a final key.

* * * * *